US008893679B2

(12) United States Patent
Renner

(10) Patent No.: US 8,893,679 B2
(45) Date of Patent: Nov. 25, 2014

(54) AUTOMATIC START AND STOP OF A PORTABLE ENGINE DRIVEN POWER SOURCE

(71) Applicant: Illinois Tool Works Inc., Glenview, IL (US)

(72) Inventor: Ross Renner, Black Creek, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 14/153,750

(22) Filed: Jan. 13, 2014

(65) Prior Publication Data

US 2014/0129118 A1 May 8, 2014

Related U.S. Application Data

(63) Continuation of application No. 12/781,757, filed on May 17, 2010, now Pat. No. 8,627,797.

(60) Provisional application No. 61/186,156, filed on Jun. 11, 2009.

(51) Int. Cl.
| | |
|---|---|
| *F02N 11/08* | (2006.01) |
| *H02P 3/00* | (2006.01) |
| *B66C 23/42* | (2006.01) |
| *F02D 29/00* | (2006.01) |
| *F02B 63/06* | (2006.01) |
| *F02D 29/04* | (2006.01) |
| *B60P 3/14* | (2006.01) |
| *F02D 29/06* | (2006.01) |

(52) U.S. Cl.
CPC ............... *F02B 63/06* (2013.01); *B66C 23/42* (2013.01); *F02D 29/00* (2013.01); *F02D 29/04* (2013.01); *B60P 3/14* (2013.01); *F02D 29/06* (2013.01)

USPC ............................... 123/179.4; 322/11

(58) Field of Classification Search
CPC ............ B60P 3/14; F02D 29/00; F02D 29/04
USPC ............ 322/1, 3, 4, 5, 6, 7, 8, 10, 11; 123/179.3, 179.4; 701/112
See application file for complete search history.

(56) References Cited

U.S. PATENT DOCUMENTS

| 2,952,782 | A | * | 9/1960 | Woyden ...................... 290/37 A |
| 3,514,621 | A | * | 5/1970 | Crocker et al. ............. 290/37 R |

(Continued)

FOREIGN PATENT DOCUMENTS

EP        2002917        12/2008

OTHER PUBLICATIONS

Letter from Gary M. Hartman and associated product literature, invoice, and photos.

(Continued)

*Primary Examiner* — Hieu T Vo
*Assistant Examiner* — Arnold Castro
(74) *Attorney, Agent, or Firm* — Fletcher Yoder P.C.

(57) ABSTRACT

The present embodiments provide a control system and method that is able to automatically start and/or stop a portable engine-driven power source. For example, in one embodiment, a system includes an engine-driven power source having an engine, a compressor driven by the engine, a sensor configured to generate a first signal indicative of a demand for air pressure from the compressor and a second signal indicative of no demand for air pressure from the compressor. The engine-driven power source also includes a controller configured to stop the engine in response to the second signal.

20 Claims, 6 Drawing Sheets

(56) References Cited

U.S. PATENT DOCUMENTS

| | | |
|---|---|---|
| 4,217,764 A | 8/1980 | Armbruster |
| 4,236,594 A | 12/1980 | Ramsperger |
| 4,788,487 A | 11/1988 | Picklesimer |
| 5,421,705 A | 6/1995 | Benckert |
| 5,671,112 A * | 9/1997 | Hu et al. ................... 361/86 |
| 5,734,239 A | 3/1998 | Turner |
| 6,121,691 A | 9/2000 | Renner |
| 6,153,855 A | 11/2000 | Renner |
| 6,166,525 A | 12/2000 | Crook |
| 6,469,276 B1 | 10/2002 | Renner |
| 6,478,714 B2 | 11/2002 | Onnen |
| 6,603,213 B1 | 8/2003 | Renner |
| 6,754,579 B2 | 6/2004 | Kamiya |
| 6,812,584 B2 | 11/2004 | Renner |
| 6,812,585 B2 | 11/2004 | Renner |
| 7,353,084 B2 | 4/2008 | Schaper |
| 7,482,704 B2 | 1/2009 | Priem |
| 7,502,668 B2 | 3/2009 | Schaper |
| 7,692,409 B2 | 4/2010 | Schaper |
| 7,870,915 B2 | 1/2011 | Beeson |
| 7,908,911 B2 | 3/2011 | Renner |
| 8,342,150 B2 | 1/2013 | Renner |
| 8,464,526 B2 | 6/2013 | Renner |
| 8,627,797 B2 * | 1/2014 | Renner .................. 123/179.4 |
| 2002/0038643 A1 * | 4/2002 | Sumimoto et al. ......... 123/179.3 |
| 2002/0190044 A1 * | 12/2002 | Leisner et al. ............... 219/133 |
| 2003/0222626 A1 | 12/2003 | Renner |
| 2004/0108728 A1 | 6/2004 | Renner |
| 2007/0219669 A1 | 9/2007 | Schaper |
| 2008/0122195 A1 | 5/2008 | Beeson |
| 2008/0264922 A1 | 10/2008 | Fosbinder |
| 2009/0194067 A1 | 8/2009 | Peotter |
| 2010/0271197 A1 | 10/2010 | Almeida |
| 2012/0083173 A1 | 4/2012 | McMillan |
| 2013/0318971 A1 * | 12/2013 | Sora ............................... 60/711 |

OTHER PUBLICATIONS

International Search Report for application No. PCT/US2010/038003 mailed Oct. 7, 2010.

* cited by examiner

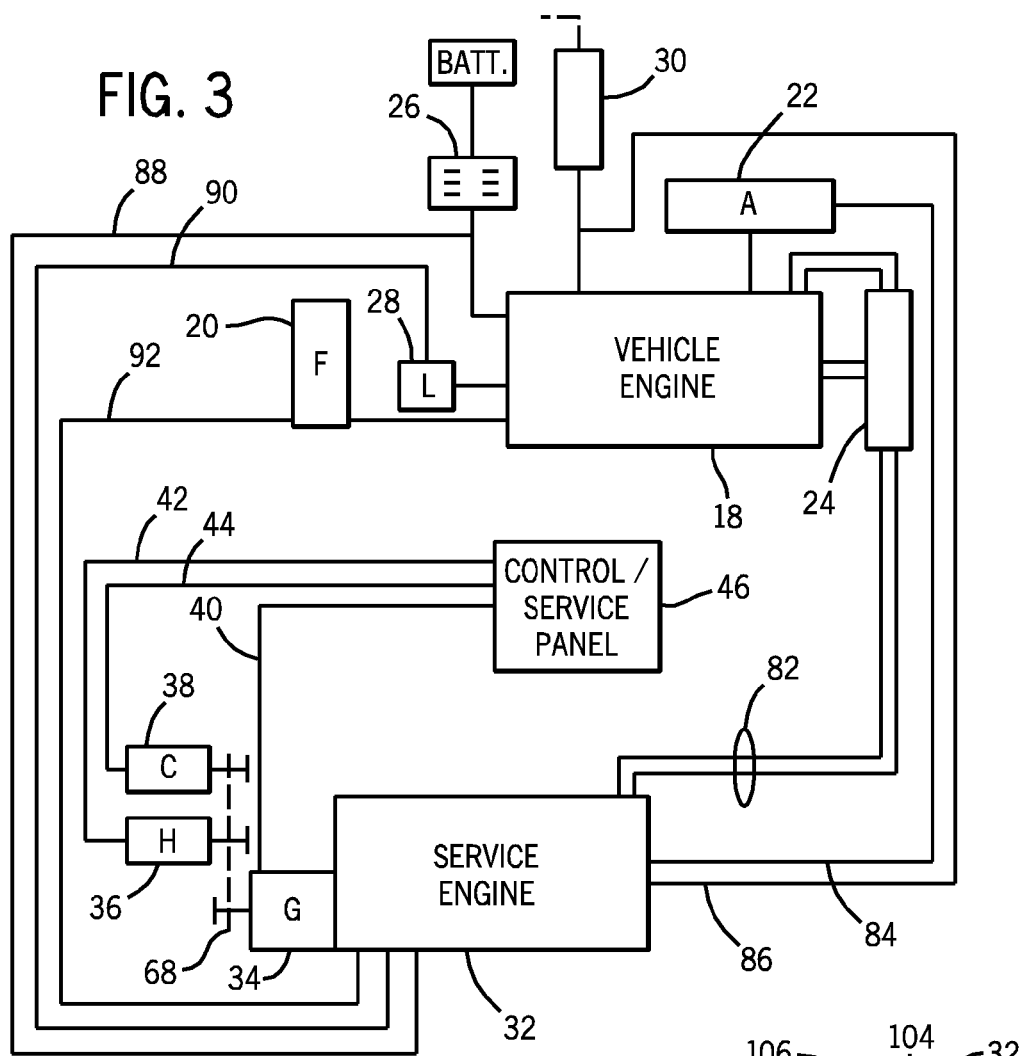
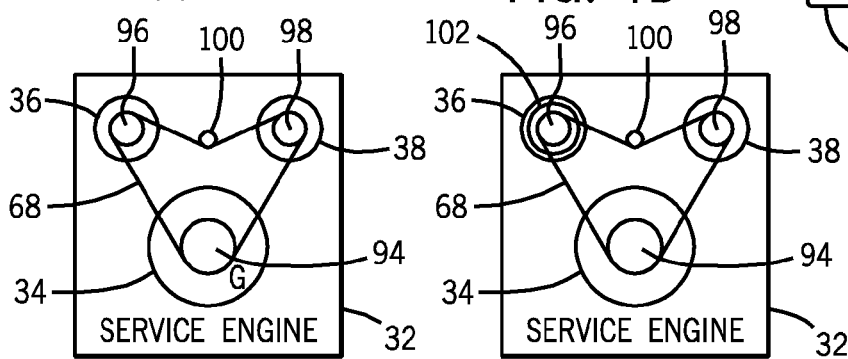
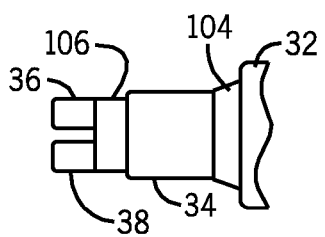

8,893,679 B2

AUTOMATIC START AND STOP OF A PORTABLE ENGINE DRIVEN POWER SOURCE

CROSS REFERENCE TO RELATED APPLICATIONS

This is a Continuation Application of U.S. patent application Ser. No. 12/781,757, entitled "AUTOMATIC START AND STOP OF A PORTABLE ENGINE DRIVEN POWER SOURCE", filed on May 17, 2010, which claims the benefit of U.S. Provisional Patent Application Ser. No. 61/186,156, entitled "AUTOMATIC START AND STOP OF A PORTABLE ENGINE DRIVEN POWER SOURCE", filed on Jun. 11, 2009, both of which are herein incorporated by reference in their entireties.

BACKGROUND

The invention relates generally to power management for an engine coupled to loads. More specifically, the invention relates to automatic start and stop features for a service pack having an engine driving various services, such as an air compressor, an electrical generator (e.g., a welding generator), a hydraulic pump, and possibly other loads.

Some work vehicles may provide auxiliary resources, such as electrical power, compressor air service, and/or hydraulic service that are powered via one or more engines, such as the vehicle engine. Of course, these integrated auxiliary resources rely on operation of the one or more engines for power. Some engines, such as the main vehicle engine, can be large engines, which are particularly noisy, significantly over powered for the integrated auxiliary resources, and fuel inefficient. Further, other smaller engines can also be fuel inefficient at times. For example, an operator typically leaves the one or more engines idling for extended periods between actual use of the integrated auxiliary resources, simply to maintain the option of using the resources without troubling the operator to start and stop the engines. Such operation reduces the overall life of the engines and drive train for vehicle transport needs.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present embodiments provide a control system and method that is able to automatically start and/or stop a portable engine-driven power source. For example, in one embodiment, a system includes an engine-driven power source having an engine, a compressor driven by the engine, a sensor configured to generate a first signal indicative of a demand for air pressure from the compressor and a second signal indicative of no demand for air pressure from the compressor. The engine-driven power source also includes a controller configured to stop the engine in response to the second signal.

DRAWINGS

These and other features, aspects, and advantages of the present invention will become better understood when the following detailed description is read with reference to the accompanying drawings in which like characters represent like parts throughout the drawings, wherein:

FIG. 3 is a diagram of an embodiment of power systems in the vehicle of FIG. 1, illustrating support systems of the service pack integrated with support systems of the vehicle engine;

FIGS. 4A-4C are diagrams of the service pack with different arrangements of a generator, a hydraulic pump, and an air compressor driven by a service pack engine in accordance with certain embodiments of the present disclosure;

DETAILED DESCRIPTION

Figure 1:
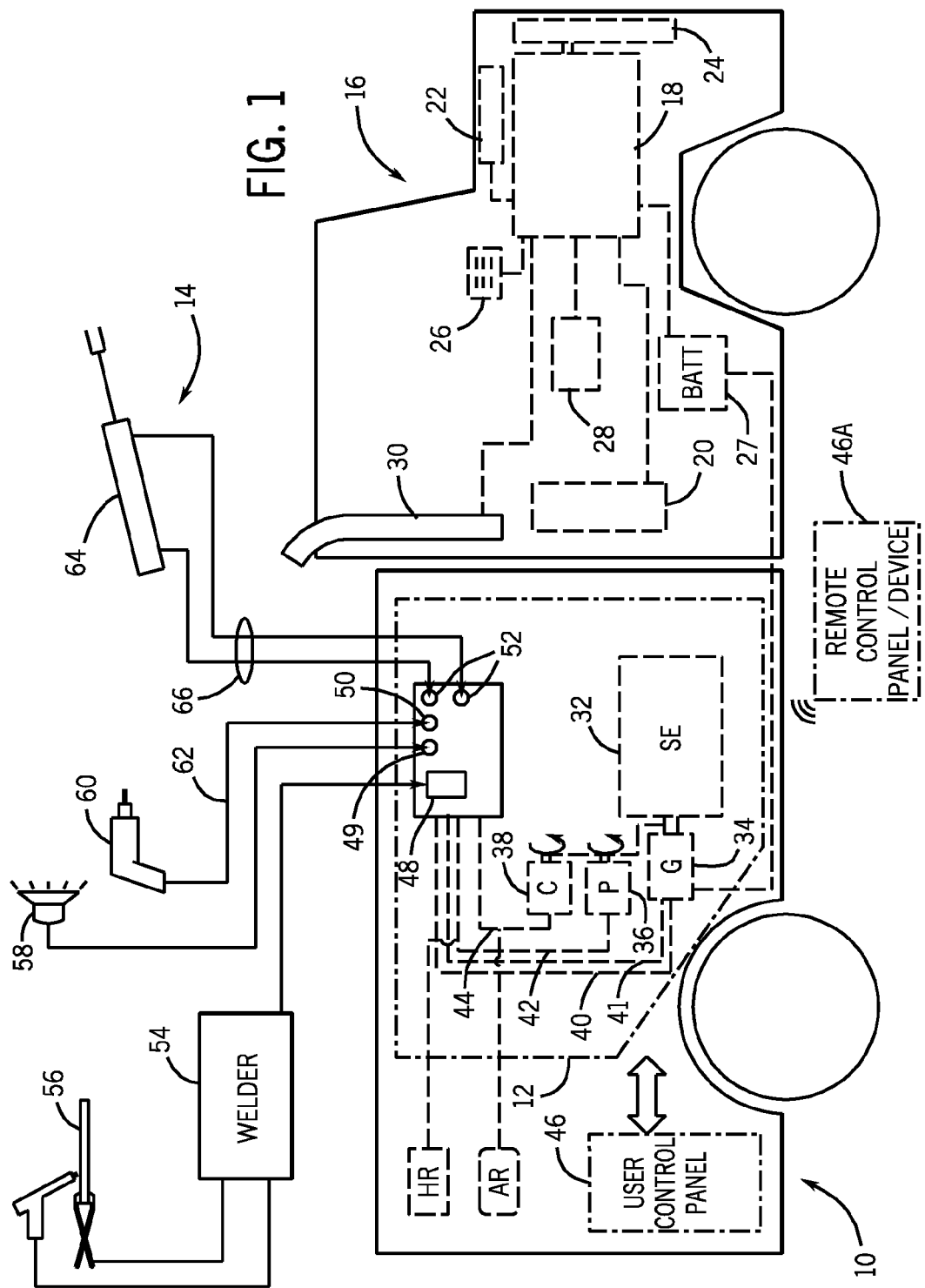
FIG. 1 is a diagram of a work vehicle having a service pack with a load control system in accordance with certain embodiments of the invention.

As discussed below, embodiments of the present technique provide a uniquely effective solution to power management and emissions control in various applications. Thus, the disclosed embodiments relate or deal with any application where a prime mover or power source that is engine driven intermittently powers a load or combination of loads. In certain embodiments, the disclosed power control techniques may be used with various service packs to prevent unnecessary or wasteful emissions of a diesel engine power source that is directly coupled to multiple loads, specifically an air compressor, hydraulic pump, auxiliary AC electric generator that may be used intermittently (i.e., not substantially continuously). For example, the disclosed embodiments may be used in combination with any and all of the embodiments set forth in U.S. application Ser. No. 11/742,399, filed on Apr. 30, 2007, and entitled "ENGINE-DRIVEN AIR COMPRESSOR/GENERATOR LOAD PRIORITY CONTROL SYSTEM AND METHOD," which is hereby incorporated by reference in its entirety. By further example, the disclosed embodiments may be used in combination with any and all of the embodiments set forth in U.S. application Ser. No. 11/943,564, filed on Nov. 20, 2007, and entitled "AUXILIARY SERVICE PACK FOR A WORK VEHICLE," which is hereby incorporated by reference in its entirety.

As discussed below, the present embodiments utilize load sensing from the prime mover (e.g., engine) and/or individual loads to automatically start and/or stop the engine, thereby substantially reducing wasted energy and emissions. The use of load sense from the prime mover and/or the individual loads may include prime mover RPM monitoring or individual output load sensing. The sensing (i.e., the representative signals of each load) may be used to determine whether the primary power source may be shut down or, alternatively, turned on. For example, in certain embodiments, a controller may acquire load information from the prime mover (e.g., engine). In addition, the controller may determine whether battery power is sufficient to drive the sensed load or if engine power is more appropriate. In situations where no load is sensed after a period of time, the controller may shut the engine off. Alternatively and/or additionally, in situations where the engine is off and the controller senses that a load has been applied (e.g., a trigger or other throttle mechanism has been engaged), the controller may initiate an engine startup sequence.

Indeed, the present systems and methods are applicable to any number of engine-driven power sources. One embodiment of the approaches described herein may be applied to a work vehicle, such as a work vehicle 10 depicted in FIG. 1. The work vehicle 10 is shown as a work truck, although the work vehicle 10 may have any other suitable configuration. In the illustrated embodiment, the vehicle 10 includes a service pack 12 for supplying various services (e.g., electrical, compressed air, and hydraulic power) to a range of applications 14. As discussed in detail below, the service pack 12 includes an engine auto stop and auto start control system and process configured to sense applied loads and automatically start and/or stop an engine when appropriate. The vehicle 10 has a main vehicle power plant 16 based around a vehicle engine 18. The main vehicle engine 18 may include a spark ignition engine (e.g., gasoline fueled internal combustion engine) or a compression ignition engine (e.g., a diesel fueled engine.

The vehicle power plant 16 includes a number of support systems. For example, the engine 18 consumes fuel from a fuel reservoir 20, e.g., one or more liquid fuel tanks. An air intake or air cleaning system 22 supplies air to engine 18, which may, in some applications, be turbo charged or super charged. A cooling system 24, e.g., a radiator, circulation pump, a thermostat-controlled valve and a fan, provides for cooling the engine 18. The vehicle power plant 16 also includes an electrical system 26, which may include an alternator or generator, along with one or more system batteries 27. The vehicle power plant 16 also includes a lube oil system 28, which may draw oil from the engine crankcase, and circulate the oil through a filter and cooler, if present, to maintain the oil in good working condition. Finally, the power plant 16 includes an exhaust system 30, which may include catalytic converters, mufflers, and associated conduits.

The service pack 12 may include one or more service systems driven by a service engine 32. In a present embodiment, the service pack 12 provides electrical power, hydraulic power, and compressed air for the applications 14. In the diagrammatical representation of FIG. 1, for example, the service engine 32 drives a generator 34 as well as a hydraulic pump 36 and air compressor 38. As discussed in detail below, the service pack 12 may detect the application of various loads (e.g., via one or more load senses). Such loads that may be associated with the service engine 32 can be sensed via a direct measurement of engine load relating to the service engine 32, a measurement of generator load relating to the generator 34, a measurement of hydraulic pump load relating to the hydraulic pump 36, and/or a measurement of compressor load relating to the air compressor 38. In response to the load sense, the service pack 12 may stop and/or start the service engine 32. For example, in order to provide power for each load, a control system, discussed in further detail below, in some embodiments, functions to turn on the engine 32 in situations where the power provided by one or more batteries 27 or the generator 34 is not sufficient, or when the service engine 32 is off. Further, the control system may turn off the service engine 32 when appropriate, such as when the service engine 32 has been running for some time and no load has been applied over a predetermined amount of time.

The generator 34 may be directly driven by the engine 32, such as by close coupling the generator 34 to the engine, or may be belt or chain driven, where desired. The hydraulic pump 36 may be based on any suitable technology, such as piston pumps, gear pumps, vane pumps, with or without closed-loop control of pressure and/or flow. In certain embodiments, the pump 36 may include a constant displacement pump, a variable displacement pump, a plurality of pumps in a parallel or series configuration, or a combination thereof. The air compressor 38 may also be of any suitable type, such as a rotary screw air compressor or a reciprocating piston air compressor.

The systems of the service pack 12 include appropriate conduits, wiring, tubing and so forth for conveying the service generated by these components to an access point, and for control by a control system. Convenient access points will be located around the periphery of the vehicle, such as access to a start button that may allow a user to turn on the service engine 32 after it has been automatically turned off. Alternatively and/or additionally, the start button may flash to alert the user that the controller has begun a startup sequence of the service engine 32. In one embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply). The hydraulic pump 36 is coupled to hydraulic circuit 42 and the air compressor 38 is coupled to an air circuit 44.

As represented generally in FIG. 1, the generator 34 is also coupled to the vehicle electrical system, and particularly to the vehicle battery 27. Thus, as described below, not only may the service pack 12 allow for 12 volt loads to be powered without operation of the main vehicle engine 18, but the vehicle battery 27 may serve as a shared battery, and is maintained in a state of charge by the service pack 12 generator output. Indeed, as described in further detail below, the control system may monitor the level of charge of the vehicle battery 27 to ensure substantially continuous monitoring of applied loads, power consumption, and so forth.

The cabling and conduits 40, 41, 42 and 44 may, as in the illustrated embodiment, route service for all of these systems directly from connections on the service pack 12. In one embodiment, for example, connections are provided at or near a base of an enclosure of the service pack 12, such that connections can be easily made without the need to open the enclosure. Moreover, certain control functions may be available from a control and service panel 46. For example, the service panel 46 may be located on any surface of the vehicle 10, or on multiple locations in the vehicle 10. The control and service panel 46 may permit, for example, starting and stopping of the service engine 32 by a keyed ignition or starter button, or by a controller that is configured to automatically start and/or stop the service engine 32 housed within the service panel 46. Other controls for the service engine 32 may also be provided on the control and service panel 46. The control and service panel 46 may also provide operator interfaces for monitoring the service engine 32, such as fuel level gages, pressure gages, as well as various lights and indicators for parameters such as pressure, speed, and so forth. For example, in situations where the control system initiates an automatic start, a light, such as an LED or similar feature, may blink or flash to indicate that the service engine 32 has initiated a startup procedure. The service panel 46 may also include a stop, disconnect or disable switch (not separately shown) that allows the operator to prevent starting of the service pack engine 32, such as during transport or if the user does not desire for the service engine 32 to be automatically started.

As also illustrated in FIG. 1, a remote control panel or device 46A may also be provided that may communicate with the control panel 46 or directly with the service pack 12 via cabling or wirelessly. In a manner similar to conventional crane or manlift controls, then, the operator may start and stop the service pack engine 32, and control certain functions of the service pack 12 (e.g., engagement or disengagement of a clutched component, such as an air compressor) without directly accessing either the components within the service pack enclosure or the control panel 46.

As noted above, any desired location may be selected as a convenient access point for one or more of the systems of the service pack 12. In the illustrated embodiment, for example, one or more alternating current electrical outputs, which may take the form of electrical receptacles 48 (for AC power) and 49 (for 12 volt DC power) are provided. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC electrical output 48, and may provide constant current or constant voltage-regulated power suitable for a welding application. The welder 54 may receive power from the electrical output of the generator 34, and itself contain circuitry designed to provide for appropriate regulation of the output power provided to cables suitable for a welding application 56.

Similarly, DC loads may be coupled to the DC receptacle 49. Such loads may include lights 58, or any other loads that would otherwise be powered by operation of the main vehicle engine 18. As mentioned above, the 12 volt DC output of the service pack 12 also serves to maintain the charge of the vehicle battery 27, and to power any ancillary loads that the operator may need during work (e.g., cab lights, hydraulic system controls, control system and load monitors, etc.).

The pneumatic and hydraulic applications may be similarly coupled to the service pack 12 as illustrated in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic service 52 by appropriate hoses or conduits 66. Certain of the applications illustrated diagrammatically in FIG. 1 may be incorporated into the work vehicle 10. For example, the work vehicle 10 may be designed to include a man lift, scissor lift, hydraulic tail gate, or any other driven systems, which can be coupled to the service pack 12 and driven separately from the main vehicle engine 18.

In use, the service pack 12 may provide power for the on-site applications 14 substantially separately from the vehicle engine 18. That is, the service engine 32 generally may not be powered during transit of the vehicle 10 from one service location to another, or from a service garage or facility to a service site. Once located at the service site, the vehicle 10 may be parked at a convenient location, and the main engine 18 may be shut down. The service engine 32 may then be powered to provide service from one or more of the service systems (e.g., generator 34, hydraulic pump 36, and air compressor 38) described above. The service pack 12 also may include clutches, or other mechanical engagement devices, for selective engagement and disengagement of one or more of the generator 34, the hydraulic pump 36, and the air compressor 38, alone or in combination with one another.

Figure 2:
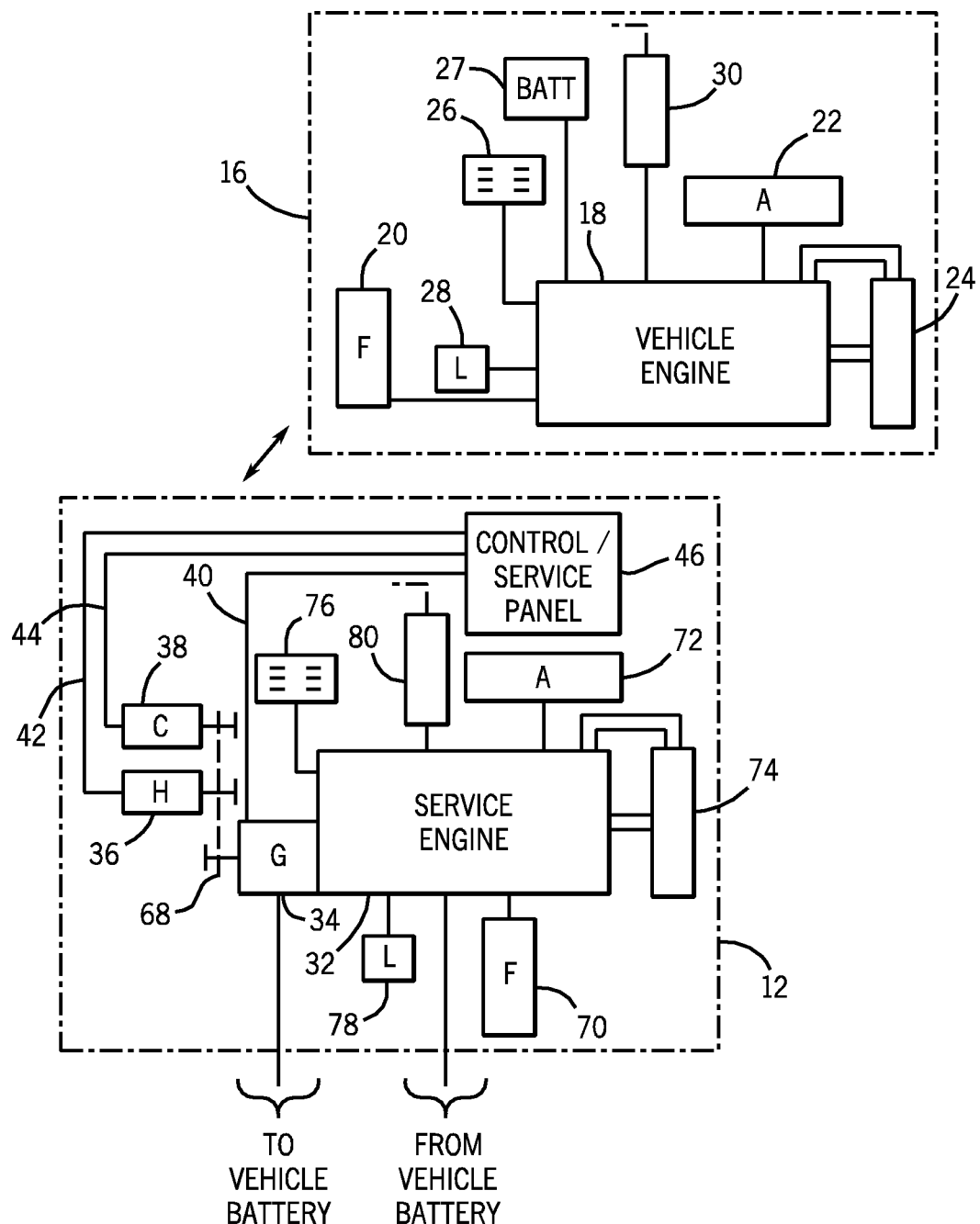
FIG. 2 is a diagram of an embodiment of power systems in the vehicle of FIG. 1, illustrating support systems of the service pack separate and independent from support systems of a vehicle engine.

Several different scenarios may be envisaged for driving the components of the service pack 12, and for integrating or separating the support systems of the service pack 12 from those of the vehicle power plant 16. One such approach is illustrated in FIG. 2, in which the service pack 12 is independent and operates separately from the vehicle power plant 16. In the embodiment illustrated in FIG. 2, as shown diagrammatically, the support systems for the vehicle power plant 16 are coupled to the vehicle engine 18 in the manner set forth above. The service pack 12 reproduces some or all of these support systems for operation of the service engine 32. In the illustrated embodiment, for example, these support systems include a separate fuel reservoir 70, a separate air cleaner system 72, a separate cooling system 74, a separate electrical protection and distribution system 76, a separate lube oil system 78, where desired for the engine, and a separate exhaust system 80.

Many or all of these support systems may be provided local to the service engine 32, that is, at the location where the service engine 32 is supported on the vehicle 10. On larger work vehicles, access to the location of the service engine 32 and the service pack 12 in general, may be facilitated by the relatively elevated clearance of the vehicle 10 over the ground. Accordingly, components such as the fuel reservoir, air cleaner, cooling system radiator, electrical fuse box, and so forth may be conveniently positioned so that these components can be readily serviced. Also, in the illustrated embodiment, the hydraulic pump 36 and air compressor 38 are illustrated as being driven by a shaft extending from the generator 34, such as by one or belts or chains 68. As noted above, one or both of these components, or the generator 34 may be provided with a clutch or other mechanical disconnect to allow them to idle while other systems of the service pack are operative.

FIG. 3 represents an alternative configuration in which the service pack support systems are highly integrated with those of the main vehicle power plant 16. In the illustration of FIG. 3, for example, all of the systems described above may be at least partially integrated with those of the vehicle power plant 16. Thus, coolant lines 82 are routed to and from the vehicle cooling system 24, while an air supply conduit 84 is routed from the air intake or cleaner 22 of the vehicle engine. Similarly, an exhaust conduit 86 routes exhaust from the service engine 32 to the exhaust system 30 of the vehicle engine 18. The embodiment of FIG. 3 also illustrates integration of the electrical systems of the vehicle 10 and the service pack 12, as indicated generally by the electrical cabling 88 which routes electrical power to the distribution system 26 of the vehicle. The systems may also integrate lube oil functions, such that lubricating oil may be extracted from both crank cases in common, to be cleaned and cooled, as indicated by conduit 90. Finally, a fuel conduit 92 may draw fuel from the main reservoir 20 of the vehicle, or from multiple reservoirs where such multiple reservoirs are present on the vehicle.

In some embodiments, integrated systems of particular interest include electrical and fuel systems. For example, while the generator 34 of the service pack 12 may provide 110 volt AC power for certain applications, its ability to provide 12 volt DC output is particularly attractive to supplement the charge on the vehicle batteries, for charging other batteries, and so forth. The provision of both power types, however, makes the system even more versatile, enabling 110 volt AC loads to be powered (e.g., for tools, welders, etc.) as well as 12 volt DC loads (e.g., external battery chargers, portable or cab-mounted heaters or air conditioners, etc.).

In certain embodiments, a system may include an integration solution between those shown in FIG. 2 and FIG. 3. For example, some of the support systems may be best separated in the vehicle 10 both for functional and mechanical or flow reasons. The disclosed embodiments thus contemplate various solutions between those shown in FIG. 2 and FIG. 3, as well as some degree of elimination of redundancy between these systems. In a presently contemplated embodiment, at least some of the support systems for the primary vehicle engine 18 are used to support the service pack 12 power plant. For example, at least the fuel supply and electrical systems can be at least partially integrated to reduce the redundancy of these systems. The electrical system may thus provide certain support functions when the vehicle engine is turned off, removing dependency from the electrical system, or charging the vehicle batteries 27. Similarly, heating, ventilating and air conditioning systems may be supported by the service pack engine 32, such as to provide heating of the vehicle cab when the primary engine 18 is turned off. Thus, more or less integration and removal of redundancy is possible. It should be noted that any of the loads described above may be monitored, further including, for example, air conditioning, heat, various support systems, and so on. As such, the methods of power control as described herein may also include an automatic start and/or stop of the vehicle engine 18 in addition to or in lieu of the service engine 32. For example, in embodiments where the vehicle engine 18 is turned off and many loads are being applied to the service engine 32, the controller may automatically start the vehicle engine 18 to avoid or at least mitigate the possibility of engine overload.

The foregoing service pack systems may also be integrated in any suitable manner for driving the service components, particularly the generator 34, hydraulic pump 36, and air compressor 38, and particularly for powering the on-board electrical system, including a control system or similar feature. Accordingly, any of these may be automatically stopped and/or started in accordance with the embodiments disclosed herein. FIGS. 4A-4C illustrate diagrams of certain implementations for driving these components from the service engine 32. In the embodiment illustrated in FIG. 4A, the generator 34 may be close-coupled to the output of the engine 32, such as directly to the engine fly wheel or to a shaft extending from the engine 32. A sheave 94 is mounted to an output shaft extending from the generator, and similar sheaves 96 and 98 are coupled to the hydraulic pump 36 and air compressor 38. One or more belts 38 and/or clutches are drivingly coupled between these components, and an idler 100 may be provided for maintaining tension on the belt. Such an arrangement is shown in FIG. 4B, in which the hydraulic pump 36 is driven through a clutch 102, such as an electric clutch. It should be noted that any one of the components may be similarly clutched to allow for separate control of the components. Further, in one embodiment, the automatic start and/or stop control may operate by controlling these services through their respective clutches. Such control may be useful for controlling the power draw on or the output by the engine 32, for example when no load is drawn from the particular component over a period of time, and when the component is not needed for support of the main vehicle engine systems (e.g., maintaining a charge on the vehicle batteries).

These components may be supported in any suitable manner, and may typically include some sort of rotating or adjustable mount such that the components may be swung into and out of tight engagement with the belt to maintain the proper torque-carrying tension on the belt and avoid slippage. More than one belt may be provided on appropriate multi-belt sheaves, where the torque required for turning the components is greater than that available from a single belt. Other arrangements, such as chain drives, may also be envisaged. Moreover, as described above, the generator 34 may also be belt or chain driven, or more than one component may be driven directly by the engine 32, such as in an in-line configuration. In other arrangements, one or more of the components may be gear driven, with gearing providing any required increase or decrease in rotational speed from the output speed of the engine 32, such as during an automatic startup or shutdown sequence. In FIG. 4C, a support adapter 104 mounts the generator 34 on the service engine 32, and the hydraulic pump 36 and air compressor 38 are driven by a gear reducer.

The particular component or components that are directly and/or indirectly driven by the engine 32 may be selected based upon the component and engine specifications. For example, it may be desirable to directly drive the hydraulic pump 36, and to drive the generator 34 via a belt or gear arrangement, permitting the engine 32 to operate at a higher speed (e.g., 3000 RPM) while allowing a reduced speed to drive the generator (e.g., 1800 RPM for near 60 Hz AC output of a 4 pole generator). Indeed, in such configurations, it may be possible to automatically start and/or stop each of these by way of the service engine 32.

Figure 5:
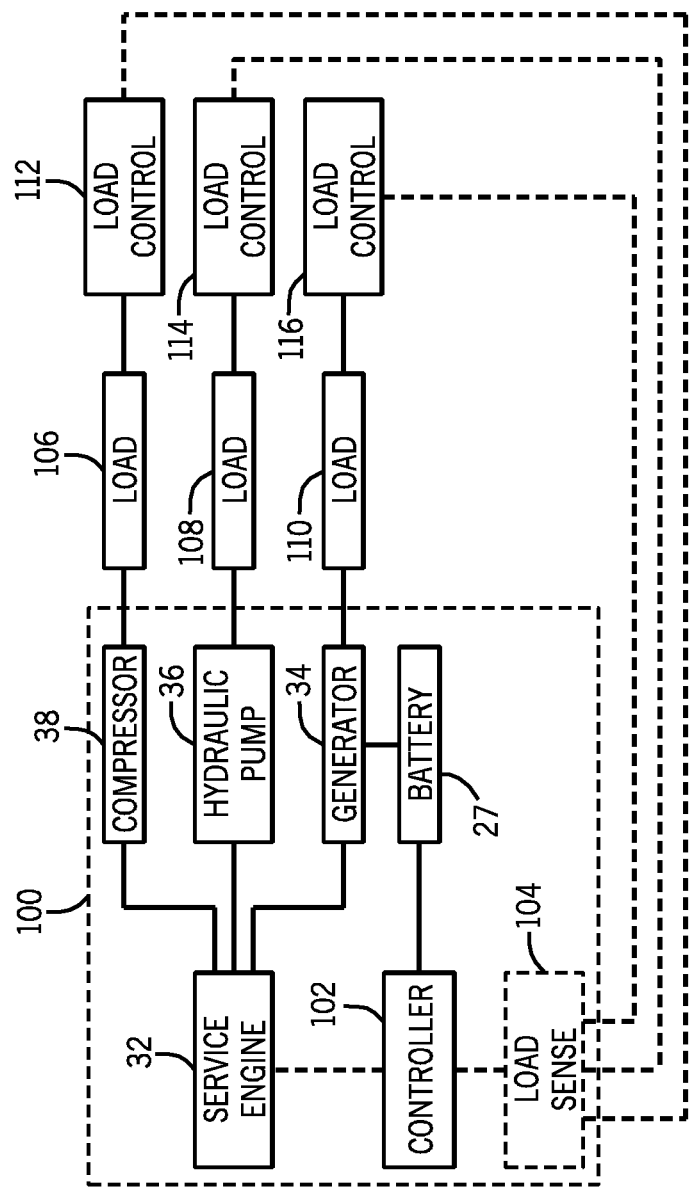
FIG. 5 is a block diagram illustrating an embodiment of a power supply system for the service pack of FIGS. 1-4, wherein the power supply system includes a controller that is configured to receive signals indicative of load demand from one or more components of the service pack of FIGS. 1-4.

FIG. 5 is a block diagram illustrating an embodiment of a power supply system 100 for the service pack 12 of FIGS. 1-4. As illustrated, the power supply system 100 includes a controller 102 operatively connected to and interfaced with the prime mover or service engine 32, the air compressor 38, the hydraulic pump 36, and the generator 34. The controller 102 may optionally be coupled to a load sense 104 that is configured to interface with components of the compressor 38, the hydraulic pump 36, the generator 34, and the engine 32. In one configuration, the controller 102 may receive (optionally via the load sense 104) information from the service engine 32 (such as RPM feedback). In situations where the service engine 32 is on for an extended period of time with no applied load (such as no change in the RPM feedback), the controller 102 may initiate a shutdown sequence of the service engine 32 and, in some situations, the power supply system 100. Additionally and/or alternatively, the controller 102 may receive, optionally via the load sense 104, information such as a pressure change (e.g., a pressure drop of a compressor storage tank) or an electrical draw, from a load 106 of the compressor 38, a load 108 from the hydraulic pump 36, a load 110 from the generator 34, and so on. Further, the load sense 104 may be communicatively coupled with a load control 112 of the compressor 38, a load control 114 of the hydraulic pump 36, and a load control 116 of the generator 34. In such implementations, the load sense 104 may detect throttle positions, pressure regulator changes, changes in electrical potential, and so forth.

For example, each component and its respective load and/or load control may provide at least two signals to the controller 102 (e.g., via the load sense 104 or other sensor). One signal may be considered a load demand while the other signal may be considered an absence of load demand. As an example, a first signal may be provided to the controller 102 that is indicative of a demand for air pressure from the compressor 36 (such as a decrease in a pressure of a compressor storage tank), while a second signal is provided to the controller 102 that is indicative of no demand for air pressure from the compressor 36 (such as a substantially constant valve of the pressure over a given time). The same may be true for all of the components operatively connected to the controller 102. Thus, the controller 102 may receive first and second signals from the hydraulic pump 36 indicative of a hydraulic demand for hydraulic pressure (e.g., a decrease in hydraulic pressure from the pump) and no hydraulic demand for hydraulic pressure (e.g., a substantially constant value of the hydraulic pressure over a given time), respectively. Similarly, the controller 102 may receive first and second signals from the generator 34 indicative of electrical demand for electrical power and no electrical demand for electrical power, respectively.

In operation, the controller 102 may substantially continuously receive such signals, such that a combination of demand and no demand signals are received from the compressor 38, the hydraulic pump 36, and the generator 34 to provide first, second, third, fourth, fifth, and sixth signals. It should be noted that the terms first through sixth are not intended to denote any sequence in time, space, or any other parameter, and are used to facilitate discussion of the present techniques. Accordingly, any one of the components of the system 100 may provide a first, second, third, fourth, fifth, or sixth signal, and so on. Further, the controller 102 is coupled to the battery 27 to ensure sufficient charge for normal operation and sensing. In embodiments where the controller 102 receives a no demand signal from each component for a given time, such as about 5 minutes (e.g., about 1, 2, 5, 10, or 15 minutes), which may be considered a first time period, the controller 102 may initiate a shutdown sequence of the service engine 32, but maintain itself in an "on" state (e.g., powered by battery 27), where the controller 102 is able to monitor applied loads. Indeed after an extended period of time, such as after greater than about 15 minutes (e.g., about 15, 20, 25, 30, 40, 45 minutes or more), which may be considered a second time period, the controller 102 may initiate a shutdown sequence that results in the controller 102 being placed in an "off" state (e.g. not powered at all), where no monitoring is performed. It should be noted that in such instances, a user may turn the power supply system 100 back on by pressing a start button, keying an ignition, or any similar act.

In situations where the controller 102 receives signals indicative of demand while the service engine 32 is running, the controller 102 may take no action. However, in situations where the service engine 32 is off but the controller 102 is still monitoring loads (e.g., after the first time period but before the second) and the controller 102 receives signals indicative of demand, the controller 102 may initiate a startup sequence of the service engine 32. Such a startup sequence may include a warning (e.g., visual or audible) to the user that the service engine 32 is about to be turned on. In such situations, the user may prevent the service engine 32 from being turned on by, for example, a killswitch or similar mechanism.

Figure 6:
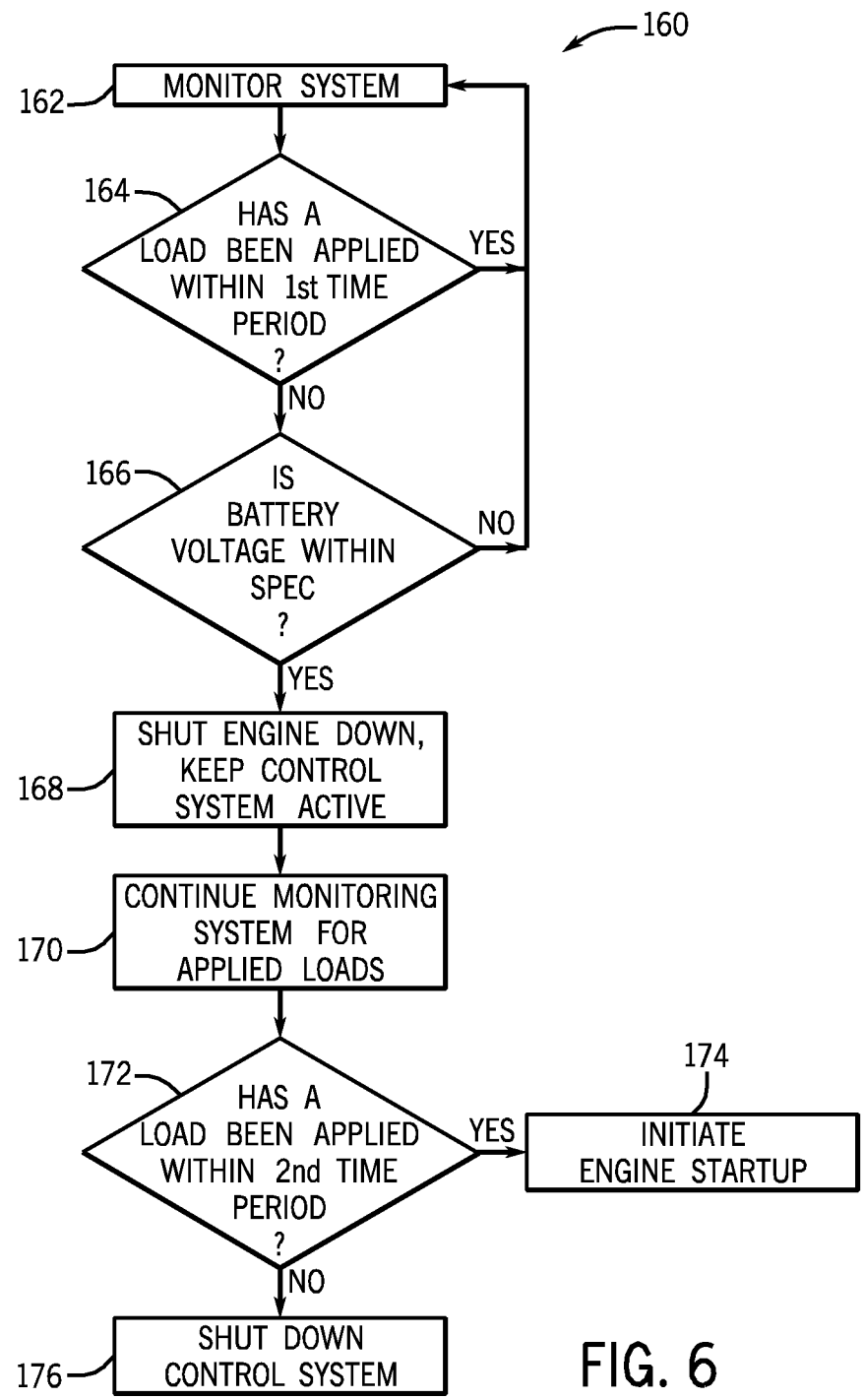
FIG. 6 is a process flow diagram illustrating an embodiment of an automatic shutdown method performed by the controller of FIG. 5.

The controller 102 may contain processing components configured to perform the tasks described above. For example, the controller 102 may contain one or more processing components configured to execute one or more algorithms capable of performing such load sensing and power control functions. Accordingly, the present embodiments provide a method or sequence 160 of automatically shutting down the service engine 32, which is depicted as a process flow diagram in FIG. 6. While the automatic shutdown sequence 160 is described in the context of the power supply system 100 and, by extension the service pack 12, it should be noted that the methods disclosed herein are also applicable to other power supply schemes, such as any power supply utilizing an engine to drive one or more loads. The method 160 includes a step of monitoring the system (such as system 100 of FIG. 5), where the controller 102 monitors, optionally via the load sense 104 or other sensor, the service engine 32 for power draw (i.e., a demand for power), or monitors the loads or load controls of each component (block 162). For example, the controller 102 may receive, substantially constantly, the first and/or second signals described above with respect to FIG. 5.

Substantially concurrently to performing such monitoring functions, the controller 102 may determine whether a load has been applied, or whether there has been a signal representative of demand from any of the components that are operatively connected to the service engine 32 (block 164). For example, the controller 102 may perform a timing function to determine how long it has been since a load has been applied or a signal representative of a load demand has been received. The sensed load can be applied to the battery 27, for example if the engine 12 or 32 is off and the battery 27 is able to provide a suitable amount of energy for the applied load. In one embodiment, such power provision by the battery 27 may obviate the need to turn on the engine 32. As such, the load handled by the battery may not be considered as a load requiring startup. Additionally or alternatively, the sensed load may reach a threshold value, for example a threshold of required power output that the battery 27 is unable to handle. Indeed, the load sense may also include a determination as to whether the battery 27 has sufficient remaining charge to continue powering an applied load while the engine 32 is off. As an example, the applied load may reduce the charge to approximately 5, 10, 15, or 20% of full charge. Upon reaching such a set charge level, the controller may sense an actual load application requiring startup of the engine 32. In embodiments where a load demand signal has been received within the first time period (e.g., within about 1, 5, 10, or 15 minutes), the method 160 may return to block 162, where the controller 102 monitors the system 100 for any changes in load demand and so forth.

In embodiments where there has not been a signal indicative of a load demand (i.e., substantially constant reception of signals indicative of no load from all components) within the first time period, the method 160 progresses to another step where the controller 102 determines whether the charge on the battery (such as battery 27 of FIG. 5) is sufficient to allow the controller 102 to perform monitoring without being powered by the generator 36 and/or service engine 32 (block 166). Further, the battery 27 may provide power to various service pack features while the service engine 32 begins a startup sequence, as described below. In embodiments where the battery 27 is determined not to have acceptable charge (e.g., a voltage within a set specification), the method 160 may provide for the controller 102 to continue operating the engine 32 while monitoring the system 100 (block 162) until the battery 27 reaches a suitable charge level.

Once the battery 27 has reached a suitable charge (e.g., the voltage is within a set specification) and no load has been sensed, the method 160 may provide for the controller 102 to perform an automatic stop or shutdown of the service engine 32 (block 168) while keeping the controller 102 active (e.g., battery powered) to perform the monitoring functions described above. Accordingly, the controller 102 continues to monitor the system 100 (block 170). The controller 102 may then determine whether a load has been applied during the second time period for example, after about 15, 20, 25, 30, 35, 40, 45 minutes or more total, including the first time period (block 172). If no signal indicative of a load demand has been received by the controller 102 within the second time period, the controller 102 may initiate a shutdown of the entire system 100 (block 176), including the controller 102 itself. Accordingly, if the user desires to utilize the power supply system 100 thereafter, the user may manually start the system 100, for example by depressing a start button or keying an ignition. It should be noted that in such situations, such as at manual startup, the entire system 100 may initially be powered by the service engine 32.

Figure 7:
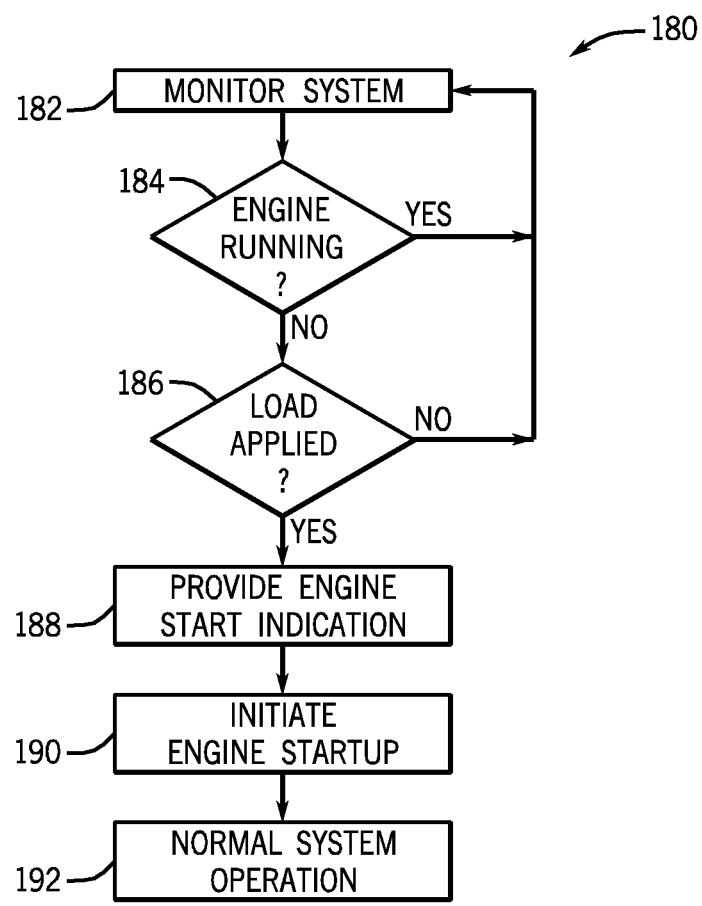
FIG. 7 is a process flow diagram illustrating an embodiment of an automatic startup method performed by the controller of FIG. 5.

Conversely, if the controller determines that a load has been applied to the system 100 (e.g., the controller 102 receives a signal indicative of demand from any one of the components of the system 100) within the second time period, the controller 102 may initiate a startup sequence (block 174) of the service engine 32. It should be noted that such an act may be performed when the signal indicative of demand is received (i.e., within a few seconds of receiving the signal), such that the service engine 32 is able to provide the desired power in a timely manner. The startup sequence may include a number of acts performed by the controller 102, including providing a warning to the user (e.g., visual and/or audible) that the startup sequence has been initiated, among others. As an example, the visual indication may include one or more blinking lights, a blinking startup button, the lights on the service vehicle 10 may flash, and so on. The audible indication may include a series of beeps of the same or different volumes emitted by, for example a separate speaker, or a horn of the service vehicle may provide the audible indication, such as a series of honks that is indicative of impending startup. The automatic start sequence is described in further detail below with reference to FIG. 7, which is a process flow diagram of an automatic start sequence or method.

It should be noted that the automatic start sequence or method 180 may be performed by the controller 102 either in concert with or substantially independent of the automatic shutdown method 160 described above. That is, the controller 102 may be configured to perform only the automatic shutdown sequence 160, only the automatic start sequence, or a combination of both. Accordingly, while the automatic startup sequence 180 is described as a set of acts performed during or after the automatic shutdown sequence 160 in the present disclosure, it should be noted that the controller 102 may perform such acts in an independent manner as well.

Accordingly, the sequence 180 may provide for the controller 102 to monitor the system 100 (block 182), such as for signals indicative of load demand. The controller 102 also determines whether the service engine 32 is running (block 184). In situations where the controller 102 determines that the engine is running, the method 180 may provide for the controller 102 to cycle back to block 182 to continue monitoring the system 100. If the controller 102 determines that the engine 32 is not running, for example in situations where the controller 102 is running substantially only on power provided by the battery 27, the controller 102 makes a further determination as to whether a load has been applied (block 186), for example, within the first time period described above with respect to FIGS. 5 and 6. In situations where the controller 102 determines that no load has been applied (e.g., only signals indicative of no load demand have been received), the controller 102 may continue monitoring the system 100 (block 182).

However, in embodiments where the controller 102 determines that a load has been applied, for example if the controller 102 receives a signal indicative of a load demand within the first time period, the controller 102 may provide an indication to the user (block 188) that the service engine 32 startup has been initiated. The indication may be a flashing start button, such as a start button on the control panel 46 (FIG. 1), or may be an audible alert, or a combination of both. The indication may last for a time that is specified by the user or the manufacturer. As an example, the indication may last less than about one minute, such as about one minute, or about 45, 40, 35, 30, 25, 20, 15, 10, or 5 seconds. In such a timeframe, the user may choose to abort the automatic start, or may choose to initiate the startup substantially immediately, such that the time between load application and startup is reduced.

Nevertheless, after the engine start indication has been provided (block 188), the controller 102 may then initiate the engine autostart (block 190). The autostart initiation may include the controller 102 providing a start signal to the engine 32 (or an engine controller). Once the engine 32 is started, the system 100 may perform normal power supply functions (block 192).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
an engine-driven power source, comprising:
an engine;
a compressor driven by the engine; and
a sensor configured to generate a first signal indicative of a demand for air pressure from the compressor, and a second signal indicative of no demand for air pressure from the compressor;
a controller communicatively coupled to the sensor and comprising one or more processing components configured to execute a shutdown sequence in response to the second signal, wherein the shutdown sequence includes a first time period while the second signal indicates no demand and a second time period while the second signal indicates no demand, wherein the engine is shut down at the end of the first time period and the controller is shut down at the end of the second time period; and
a remote control panel communicatively coupled to the controller and configured to control functions of the controller until the end of the second time period when the controller is shut down.

2. The system of claim 1, wherein the remote control panel is communicatively coupled to the controller wirelessly.

3. The system of claim 1, wherein the remote control panel is communicatively coupled to the controller via cabling.

4. The system of claim 1, wherein the one or more processing components are configured to start the engine in response to the first signal.

5. The system of claim 4, wherein the first signal represents a decrease in a pressure of a compressor storage tank, and the second signal represents a substantially constant value of the pressure over a time period.

6. The system of claim 4, wherein the one or more processing components are configured to initiate a startup sequence in response to the first signal, and the startup sequence comprises a user warning followed by an automatic engine start after a time period.

7. The system of claim 1, wherein the engine-driven power source requires a manual engine restart after the second time period.

8. The system of claim 1, wherein the engine-driven power source comprises a hydraulic pump driven by the engine, another sensor configured to generate a third signal indicative of a hydraulic demand for hydraulic pressure from the hydraulic pump, and a fourth signal indicative of no hydraulic demand for hydraulic pressure from the hydraulic pump, the one or more algorithms are configured to start the engine in response to the third signal, and the one or more algorithms are configured to stop the engine in response to the fourth signal.

9. The system of claim 1, wherein the engine-driven power source comprises an electrical generator driven by the engine, another sensor configured to generate a third signal indicative of an electrical demand for electrical power from the electrical generator, and a fourth signal indicative of no electrical demand for electrical power from the electrical generator, the one or more algorithms are configured to start the engine in response to the third signal, and the one or more algorithms are configured to stop the engine in response to the fourth signal.

10. The system of claim 1, wherein the engine-driven power source automatically restarts after the first time period in response to the first signal.

11. A system, comprising:
an engine-drive power source, comprising:
an engine;
a hydraulic pump driven by the engine; and
a sensor configured to generate a first signal indicative of a demand for hydraulic pressure from the hydraulic pump, and a second signal indicative of no demand for hydraulic pressure from the hydraulic pump;
a controller communicatively coupled to the sensor and comprising one or more processing components configured to execute a shutdown sequence in response to the second signal, wherein the shutdown sequence includes a first time period while the second signal indicates no demand and a second time period while the second signal indicates no demand, wherein the engine is shut down at the end of the first time period and the controller is shut down at the end of the second time period; and
a remote control panel communicatively coupled to the controller and configured to control functions of the controller until the end of the second time period when the controller is shut down.

12. The system of claim 11, wherein the remote control panel is communicatively coupled to the controller wirelessly.

13. The system of claim 11, wherein the remote control panel is communicatively coupled to the controller via cabling.

14. The system of claim 11, wherein the one or more processing components are configured to start the engine in response to the first signal.

15. The system of claim 14, wherein the first signal represents a decrease in the hydraulic pressure, and the second signal represents a substantially constant value of the hydraulic pressure over a time period.

16. The system of claim 14, wherein the one or more processing components are configured to initiate a startup sequence in response to the first signal, and the startup sequence comprises a user warning followed by an automatic engine start after a time period.

17. The system of claim 11, wherein the engine-driven power source requires a manual engine restart after the second time period.

18. The system of claim 11, wherein the engine-driven power source comprises an electrical generator driven by the engine, a second sensor configured to generate a third signal indicative of an electrical demand for electrical power from the electrical generator, and a fourth signal indicative of no electrical demand for electrical power from the electrical generator, the one or more algorithms are configured to start the engine in response to the third signal, and the one or more algorithms are configured to stop the engine in response to the fourth signal.

19. The system of claim 18, wherein the engine-driven power source comprises a compressor driven by the engine, a third sensor configured to generate a fifth signal indicative of an air demand for air pressure from the compressor, and a sixth signal indicative of no air demand for air pressure from the compressor, the one or more algorithms are configured to start the engine in response to the fifth signal, and the one or more algorithms are configured to stop the engine in response to the sixth signal.

20. The system of claim 11, wherein the engine-driven power source automatically restarts after the first time period in response to the first signal.

* * * * *